Patented Jan. 5, 1954

2,665,234

UNITED STATES PATENT OFFICE 2,665,234

DIBENZOTHIOPHENES AS FUNGICIDES

Lyle D. Goodhue, Bartlesville, Okla., and Carolyn E. Tissol, St. Paul, Minn., assignors to Phillips Petroleum Company, a corporation of Delaware No Drawing. Application July 26, 1951,
Serial No. 238,785

12 Claims. (Cl. 167—38)

1

This invention relates to new fungicides, namely, dibenzothiophene and substituted dibenzothiophenes.

We have now discovered that dibenzothiophene and substituted dibenzothiophenes are excellent fungicides. The compounds of the present invention may be represented by the following general formula:

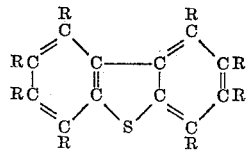

wherein the R's may be hydrogen or alkyl, alkenyl, halo, nitro, cyano, amino, or carboxy groups; the R's can be alike or different and when the R's are alkyl or alkenyl groups they shall contain not to exceed three carbon atoms.

Typical compounds of the present invention include dibenzothiophene, 1,9-dichlorodibenzothiophene, 1,9 - dimethyldibenzothiophene, 1-chloro - 9 - nitrodibenzothiophene, 1 - chloro - 9-aminodibenzothiophene and the like.

These compounds are effective for the control of fungi found on trees, grain, flowers, and other plants. They are valuable as disinfectants for seeds such as rice, barley, peas and others. Another application of these compounds is for the impregnation of shoes, tents, textiles, leather items, etc. for the prevention of various mold formations thereon.

It is an advantage of the present compounds, specifically of dibenzothiophene, that they are substantially non-phytotoxic to plants to which applied. It is a further advantage that these compounds are relatively insoluble in water and are therefore resistant to being washed from plants or surfaces to which applied.

The compounds of this invention may be applied for their intended purpose by any suitable method such as by spraying as solutions, suspensions or the like. When used as seed disinfectants, they may be mixed with talc or other inert diluent powders and sprinkled or shaken with the seed. Herein and in the claims "fungi situs" is inclusive of actual contact of the compounds of the invention with fungi or the place or situs at which the fungi may be found or expected to be found.

EXAMPLE

The infected barley method was used to demonstrate the fungicidal activity of dibenzothiophene. The following is an account of said method.

A nine centimeter filter paper was placed in the bottom of a ten centimeter petri dish and varying amounts of the chemical added. The chemical was dissolved in acetone. After the solution was applied to the paper the solvent was allowed to evaporate completely so that the manner in which it was applied did not enter into the results. The amounts supplied to the various test papers were 10 mg., 1 mg. and 0.1 mg. Ten grains of barley infected with *Helminthosporium sativum* were placed on treated papers together with about 5 ml. of water and placed at 70° F. to incubate. Two checks were set up with no chemical on the paper. Observations were made after 3 and 6 days. In the checks about 90 per cent of the grains of barley become black with the sporulating fungus and the black growth extended onto the paper. Some sprouting of the barley took place, but the fungus interfered with its growth. On treated paper, there was no growth of fungus. The growth, of course, depends on the amount of fungicide present. With a good fungicide, growth of the fungus on the seeds is also prevented at a sufficient concentration.

Results using dibenzothiophene and a control are recorded below:

TABLE I

*Results of fungicidal tests using infected barley*

| | Dosage in mg. | Percentage infection | |
|---|---|---|---|
| | | Seeds | Paper |
| Dibenzothiophene | 10 | 20 | 0 |
| | 1 | ¹40 | 0 |
| | 0.1 | 40 | 0 |
| Check No. 1 (no fungicide) | | 100 | 70 |
| Check No. 2 (no fungicide) | | 100 | 90 |

¹ Vari-colored fungi—not black.

Permanency tests

The usual laboratory tests may show outstanding fungicidal activity for a chemical which is a complete failure under practical conditions. If it is too soluble, it will be leached away. If it is unstable it will decompose or chemical reactions may change it to an ineffective compound.

The infected barley test can be modified into a convenient test for permanence. Instead of setting up the test as soon as the candidate fungicide is deposited on the filter paper, the treated paper may be subjected to various treatments and then tested for remaining fungicidal effectiveness. The effects of washing, wind and sunlight, dry storage and wet storage on dibenzothiophene were studied. Some commercially available fungicides, namely Thiuram and Semesan were subjected to the same treatments for comparison.

Effect of washing

Filter papers were treated with dibenzothiophene and soaked for 24 hours in one liter of tap water. They were removed and put into clean petri dishes, nutrient and barley added, and incubated at 70±2° F. for six days (see Table II).

TABLE II

*Results of washing tests*

|  | Percentage infection at X dosage | | | |
|---|---|---|---|---|
|  | 10 mg. | | 1 mg. | |
|  | Seeds | Paper | Seeds | Paper |
| Dibenzothiophene | ³ 30 | 0 | 90 | 20 |
| Thiuram ¹ | 90 | 0 | 100 | 0 |
| Semesan ² | 50 | 0 | 80 | 0 |
| Check No. 1 (no fungicide) | 90 | 0 | 90 | 0 |
| Check No. 2 (no fungicide) | 100 | 60 | 100 | 60 |

¹ Thiuram—tetramethyl thiuram disulfide.
² Semesan—p-hydroxymercuri-o-chlorophenol.
³ Vari-colored fungi, not black.

Effect of wind and sunlight

For the control of fungus diseases on plants the fungicide should resist weathering for a period long enough to kill nearly all the spores present. To simulate conditions in a tree, treated filter papers were exposed on the roof of a building. They were suspended with pincer-type clothes pins attached to a wire. The results are shown in Table III.

TABLE III

*Effect of wind and sunlight for various periods*

| Dosage in mg. | Percentage infection | | | |
|---|---|---|---|---|
|  | 1 hour | | 7 days | |
|  | Seeds | Paper | Seeds | Paper |
| Dibenzothiophene | 1 | 50 | 20 | ¹ 5 | 0 |
| Thiuram | 1 | 60 | 40 | 100 | (²) |
| Semesan | 1 | 80 | 20 | 100 | 70 |

¹ Vari-colored fungi—not black.
² Fungi scattered over the paper.

Effect of storage

Additional filter papers were treated and stored for a week before testing for fungicidal action. One set was stored dry in open petri dishes and one set was stored wet in closed petri dishes. Both were kept dark. After one week nutrient solution was added on the filter papers and ten grains of barley were incubated on them in the usual way. The results are recorded in Table IV.

TABLE IV

*Effect of wet and dry storage in darkness for one week*

|  | Percentage infection | | | |
|---|---|---|---|---|
|  | 10 mg. | | 1 mg. | |
|  | Seeds | Paper | Seeds | Paper |
| Wet: | | | | |
| Dibenzothiophene | 30 | 0 | ¹ 40 | ¹ 20 |
| Semesan ² | 70 | 0 | 70 | 0 |
| Dry: | | | | |
| Dibenzothiophene | ¹ 50 | ¹ 10 | ¹ 90 | ¹ 20 |
| Semesan ² | 80 | 0 | 90 | 0 |

¹ Vari-colored fungi, not black.
² Semesan—p-hydroxymercuri-o-chlorophenol.

Phytotoxicity

In the above tests the stem and root growth were not inhibited. It was therefore obvious that dibenzothiophene did not hinder the growth of sprouting barley and is therefore considered substantially non-phytotoxic.

Reasonable variation and modification are possible within the scope of the foregoing disclosure and the appended claims to the disclosure the essence of which is that dibenzothiophene and substituted dibenzothiophenes have been discovered to possess excellent fungicidal activity and therefore that a method for the control of fungi has been set forth.

We claim:

1. A method for the control of fungus which comprises applying to the fungus a composition containing as its sole essential fungicidal ingredient a compound represented by the general formula

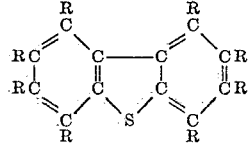

wherein the R's are selected from the group consisting of hydrogen alkyl, halo, nitro, and amino groups; the R's can be different and when the R's are alkyl groups they shall contain not to exceed three carbon atoms.

2. A method for the control of fungus which comprises applying to the fungus dibenzothiophene which at said situs is the sole fungicidal material which has been applied.

3. A method for the control of fungus which comprises applying to the fungus 1,9-dichlorodibenzothiophene which at said situs is the sole fungicidal material which has been applied.

4. A method for the control of fungus which comprises applying to the fungus 1,9-dimethyldibenzothiophene which at said situs is the sole fungicidal material which has been applied.

5. A method for the control of fungus which comprises applying to the fungus 1-chloro-9-nitro-dibenzothiophene which at said situs is the sole fungicidal material which has been applied.

6. A method for the control of fungus which comprises applying to the fungus 1-chloro-9-aminodibenzothiophene which at said situs is the sole fungicidal material which has been applied.

7. A method for the control of *Helminthosporium sativum* which comprises applying to the said fungus a composiiton containing as its sole essential fungicidal ingredient a compound represented by the general formula

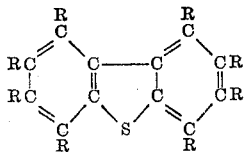

wherein the R's are selected from the group consisting of hydrogen alkyl, halo, nitro, and amino groups; the R's can be different and when the R's are alkyl groups they shall contain not to exceed three carbon atoms.

8. Seed impregnated with dibenzothiophene in fungicidal amounts.

9. Barley impregnated with dibenzothiophene in fungicidal amounts.

10. A method for the control of *Helminthosporium sativum* which comprises applying to said fungus a composition containing as its sole essential fungicidal ingredient dibenzothiophene.

11. Seed impregnated with fungicidal amounts of a compound represented by the general formula

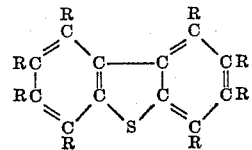

wherein the R's are selected from the group consisting of hydrogen, alkyl, halo, nitro, and amino groups; the R's can be different and when the R's are alkyl groups they shall contain not to exceed three carbon atoms.

12. A product according to claim 11 wherein said seed is barley.

LYLE D. GOODHUE.
CAROLYN E. TISSOL.

References Cited in the file of this patent

UNITED STATES PATENTS

| Number | Name | Date |
|---|---|---|
| 1,887,156 | Hessle | Nov. 8, 1932 |
| 2,177,198 | Goldsworthy | Oct. 24, 1939 |
| 2,438,955 | Tryon | Apr. 6, 1948 |
| 2,527,372 | Moyle | Oct. 24, 1950 |